(12) United States Patent
Vanhoucke et al.

(10) Patent No.: US 10,132,858 B2
(45) Date of Patent: Nov. 20, 2018

(54) PUF METHOD USING AND CIRCUIT HAVING AN ARRAY OF BIPOLAR TRANSISTORS

(71) Applicant: NXP B.V., Eindhoven (NL)

(72) Inventors: Tony Vanhoucke, Bierbeek (BE); Viet Nguyen, Leuven (BE)

(73) Assignee: NXP B.V., Eindhoven (NL)

( * ) Notice: Subject to any disclaimer, the term of this patent is extended or adjusted under 35 U.S.C. 154(b) by 568 days.

(21) Appl. No.: 14/307,563

(22) Filed: Jun. 18, 2014

(65) Prior Publication Data

US 2015/0028847 A1    Jan. 29, 2015

(30) Foreign Application Priority Data

Jul. 29, 2013  (EP) .................................... 13178407

(51) Int. Cl.
*G01R 31/28* (2006.01)
*G01R 19/00* (2006.01)
(Continued)

(52) U.S. Cl.
CPC ..... *G01R 31/2836* (2013.01); *G01R 19/0092* (2013.01); *G06F 21/73* (2013.01);
(Continued)

(58) Field of Classification Search
CPC .. G01R 31/2836; G01R 19/0092; G09C 1/00; H04L 9/0866; H04L 2209/805; H04L 9/3278; H04L 9/3276; H04L 9/3273; H04L 9/3271; G06F 21/73; G06F 2221/2103; G06F 21/86; G06Q 20/3674; G06R 21/73; G04L 9/0866; G01F 21/44
(Continued)

(56) References Cited

U.S. PATENT DOCUMENTS 6,161,213 A * 12/2000 Lofstrom .............. H01L 23/544
257/E23.179
7,380,131 B1    5/2008 Trimberger
(Continued)

FOREIGN PATENT DOCUMENTS

CN    102710251 A    10/2012
CN    103198268 A    7/2013

OTHER PUBLICATIONS

T. Vanhoucke et al. "Experminental Proof of Current Bifurcation and Mutual Heating in Bipolar Transistor Arrays" IEEE Bipolar/BiCMOS Circuits and Technology Meeting, 2008.*
(Continued)

*Primary Examiner* — Tung X Nguyen
*Assistant Examiner* — Lee Rodak (57) ABSTRACT

A method of identifying a component by a response to a challenge is disclosed, the component comprising an array of bipolar transistors connectable in parallel so as to have a common collector contact, a common emitter contact and a common base contact, the challenge comprising a value representative of a total collector current value, the method comprising: receiving the challenge; supplying the total collector current to the common collector contact; detecting instability in each of a group of the transistors; and determining the response in dependence on the group. A circuit configured to operate such a method is also disclosed.

18 Claims, 8 Drawing Sheets

(51) Int. Cl.
  *G06F 21/73* (2013.01)
  *G09C 1/00* (2006.01)
  *H04L 9/08* (2006.01)
  *H04L 9/32* (2006.01)

(52) U.S. Cl.
  CPC ........ *G09C 1/00* (2013.01); *G06F 2221/2103* (2013.01); *H04L 9/0866* (2013.01); *H04L 9/3278* (2013.01); *H04L 2209/805* (2013.01)

(58) Field of Classification Search
  USPC ........... 324/522, 713, 76.39, 760.02, 762.01, 324/762.08, 762.09, 72; 380/28, 46; 326/8
  See application file for complete search history.

(56) References Cited

U.S. PATENT DOCUMENTS

| | | | | |
|---|---|---|---|---|
| 7,941,673 | B1* | 5/2011 | Trimberger | H04L 9/0866 326/41 |
| 8,912,817 | B2 | 12/2014 | Wang et al. | |
| 9,425,803 | B1* | 8/2016 | Duncan | H03K 19/17768 |
| 2011/0317829 | A1* | 12/2011 | Ficke | H04L 9/3278 380/46 |
| 2013/0322617 | A1* | 12/2013 | Orshansky | H04L 9/3278 380/28 |
| 2014/0035670 | A1* | 2/2014 | Chi | G09C 1/00 330/253 |
| 2014/0201851 | A1* | 7/2014 | Guo | H04L 9/0866 726/34 |
| 2014/0218067 | A1* | 8/2014 | Li | H03K 19/17768 326/8 |
| 2014/0327469 | A1* | 11/2014 | Pfeiffer | H03K 19/003 326/8 |

OTHER PUBLICATIONS

Guajardo, Jorge, et al; "FPGA Intrinsic PUFs and Their Use for IP Protection"; Cryptographic Hardware and Embedded Systems—CHES 2007; Springer-Verlag, Berlin, Heidelberg; pp. 63-80 (2007).
Vanhoucke, Tony, et al; "Unified Electro-Thermal Stability Criterion for Bipolar Transistors"; Proceedings of the IEEE Bipolar/BiCMOS Circuits and Technology Meeting; pp. 37-40; (Oct. 2005).
Ruhrmair, Ulrich, et al; "Modeling Attacks on Physical Uncloneable Functions"; retrieved from the internet http://people.csail.mit.edu/devadas/pubs/ccs_attack_puf.pdf on Jun. 17, 2014; 11 pages.
Klootwijk, Johan H., et al; "Photo Carrier Generation in Bipolar Transistors"; IEEE Transactions on Electron Devices, vol. 49, No. 9; pp. 1628-1632 (Sep. 2002).
Akil, Nader, et al ; "A Multimechanism Model for Photon Generation by Silicon Juncations in Avalance Breakdown"; IEEE Transactions on Electron Devices, vol. 46, No. 5; pp. 1022-1028 (May 1999).
Polonsky, Stas, et al; "Characterization of Light Emission from SiGe Heterojunction Bipolar Transistor for Photon Emission Microscopy Applications" $41^{st}$ Annual IEEE International Reliability Physics Symposium, Dallas, TX, USA; pp. 344-346 (200e).
Bryant, James ; "Analog Devices : Rarely Asked Questions (RAQs) : IC Temperature Sensors" ; Retreived from the Internet http://www.analog.com/static/imported-files/rarely_asked_questions/moreInfo_raq_gapTempSenors.html on Jan. 28, 2014 ; 4 pages (2014).
Ganta, Dinesh, et al; "A Highly Stable Leakage-Based Silicon Physical Unclonable Functions"; $24^{th}$ Annual Conference on VLSI Design; IEEE Computer Society; 6 pages (2011).
Kuindersma, P.I., et al; "The Power Conversion Efficiency of Visible Light Emitting Devices in Standard BiCMOS Processes"; $5^{th}$ IEEE International Conference on Group IV Photonics; pp. 256-258 (Sep. 2008).
Extended European Search Report for Application No. 13178407.6 (dated Feb. 6, 2014).

* cited by examiner

PUF METHOD USING AND CIRCUIT HAVING AN ARRAY OF BIPOLAR TRANSISTORS

CROSS-REFERENCE TO RELATED APPLICATIONS

This application claims the priority under 35 U.S.C. § 119 of European patent application no. 13178407.6, filed on Jul. 29, 2013, the contents of which are incorporated by reference herein.

FIELD OF THE INVENTION

This invention relates to physical unclonable functions, to physical unclonable function circuits, and to methods of identifying components.

BACKGROUND OF THE INVENTION

A physical unclonable function (PUF) is a disordered physical system that can be challenged with external stimuli, and that reacts to the external stimuli to produce a response, resulting in a challenge-response pair. The concept of a challenge-response pair is well-known in the field of security, and a PUF is a hardware-based security concept in which a disordering of the physical system, commonly on a nano-scale, is relied upon in producing the response to the challenge, such that the response depends on the particular instantiation of the system. That is to say, for a given challenge, the response of the device is unique to a device in the sense that a clone of the device will respond with a different response.

Early PUF systems were generally optical systems. It has long been known that the speckle pattern of reflection of laser light from a surface is unpredictable, due to the micro- or nano-scale disordering or roughness of most surfaces, and optical-based PUFs make use of this disorder to provide a "fingerprint" speckle pattern which is unique to the specific individual surface. Since a copy or clone of the device will not have an identical surface, the speckle pattern will be different, and it may thus be possible to uniquely identify the device.

It is also known to produce magnetic PUFs based on the nanoscale disordering of particles in thin-film magnetic layers, and coating-based PUFS which typically utilise randomly distributed dielectric materials resulting in unpredictable capacitance fields.

Silicon (or other semiconductor) based PUFs may be desirable, due to the vast experience in semiconductor technology. An example of a silicon device based PUF is a SRAM (static random access memory) PUF. These are based on the repeatable, but unpredictable, differences between individual cells in a memory array, due to variations e.g. in doping levels. An example of such a SRAM PUF is described by J. Guajardo, S. et al, in "FPGA intrinsic PUFs and their use for IP protection", Cryptographic Hardware and Embedded Systems—CHES 2007, pages 63-80. However SRAM PUFs are generally considered to be "weak" in a cryptographic sense. It would be desirable to provide an alternative type of physical unclonable function.

SUMMARY

According to a first aspect there is provided a method of identifying a component by a response to a challenge, the component comprising an array of bipolar transistors each having a base contact, and main contacts being a collector contact and an emitter contact, and being either connectable in parallel or connected in parallel, so as to have a common collector contact, a common emitter contact and a common base contact, the method comprising: receiving the challenge; in response to the challenge, supplying a total main contact current to one of the common main contacts by increasing a current supplied to the respective common main contact from a first level to a second level; detecting instability in each of a group of the transistors; and determining the response in dependence on the group.

Thus according to embodiments of this first aspect there is provided a method of identifying a component by a response to a challenge, the component comprising an array of bipolar transistors connectable, or which may have been connected, in parallel so as to have a common collector contact, a common emitter contact and a common base contact, the challenge comprising a value representative of a total collector current, the method comprising: receiving the challenge; in response to the challenge, supplying a total collector current to the common collector contact by increasing a current supplied to the common collector contact from a first level to a second level; detecting instability in each of a group of the transistors; and determining the response in dependence on the group. Moreover, according to other embodiments of this first aspect the challenge comprises a value representative of a total emitter current, and the method comprises: receiving the challenge; in response to the challenge, supplying a total emitter current to the common emitter contact by increasing a current supplied to the common emitter contact from a first level to a second level; detecting instability in each of a group of the transistors; and determining the response in dependence on the group.

The contacts which are connectable in parallel, that is to say the respective base contacts, and respective collector contacts and respective emitter contacts, may be connected during operation of the component; alternatively one or more of the contacts (that is to say, base, emitter and collector) of each device may be connected at another time, for instance during manufacture of the component, in which case the connection may be permanent or hard-wired. The latter may particularly be the case in embodiments in which the array is the entirety of a plurality of transistors in the component.

It may be possible thereby to uniquely identify the component, and in particular to distinguish the component from a clone of that component. The method may therefore operate along the principles of a PUF. Depending on the challenge, the group of transistors in which instability may be detected may be the entire array or may be a subset of the array. In embodiments, the bipolar transistors may be bipolar junction transistors. It is convenient to fabricate an array of such transistors. In other embodiments the bipolar transistors may be heterojunction bipolar transistors. In still other embodiments, the bipolar transistors may be parasitic transistors which are formed in association with MOS devices.

In embodiments, the instability is an onset of electro-thermal instability.

In embodiments, the component may comprise a plurality of bipolar transistors wherein the array is a sub-set of the plurality, the challenge further comprises information which enables selection of the array, and the method further comprises selecting the array from the plurality of bipolar transistors. In other words, the component may have a plurality which may be many bipolar junction transistors, and only a subset may be chosen to constitute the array. In such embodiments, it may be necessary to be able to either individually connect the transistors, or to connect them in groups, so as to not connect or alternatively to be able to disconnect those transistors which are comprised in the component but do not form part of the array. For example, in a component which may comprise 512 transistors, the array may comprise 128 of the transistors: in this example, the challenge may include the number of transistors which are to be included in array, and or in the alternative, may include the choice of which of the 512 transistors in the component are selected to form part of the array. For instance, in the example mentioned above, 128 neighbouring transistors may be selected, or every fourth transistor, or some other set, may be selected. In embodiments, the remaining 384 unselected transistors may be disconnected or not connected.

In embodiments, supplying a total main contact (either collector or emitter) current comprises increasing the supplied current from a first level to a second level at a controlled rate. Thus the rate of change of collector current from the first level to second level may be controlled, which may allow a consistent and repeatable rate of change of current. This may provide for repeatable and consistent thermal dissipation in order to improve the reliability of the ordering, between transistors, of the onset of instability. Alternatively, the rate of change may not be controlled. However due to parasitic capacitances and inductances, supplying the total collector current will generally not be instantaneous. Furthermore, the first level may typically be 0, such that the collector current is increased from 0 to a total collector current which may be determined in accordance with the challenge, since the challenge comprises a value representative of the total collect current.

In embodiments detecting the onset of electro-thermal instability comprises detecting optical emission from the respective transistor. In other embodiments, detecting the onset of electro-thermal instability comprises detecting the main contact (either collector or emitter) current, of the respective transistor, crossing a current threshold. Electrical detection may be particularly convenient since measurement of small changes in current and/or voltage may generally be straightforward, and it may be possible to avoid the complexities, such as calibration of optical detectors, associated with electrical methods. Of course, it will be appreciated that in yet further embodiments, a combination of optical and electrical detection may be used.

In embodiments the response comprises the sequence corresponding to the order in which the transistors in the group undergo an onset of electro-thermal instability. A "sequence" will be understood by the skilled person to mean an ordered set, so that in these embodiments the order in which the transistors in the group undergo the onset of electrical thermal stability may be a significant aspect of the response. In embodiments in which the group is not a complete array, the members of the group may also be a significant aspect of the response. For a suitably chosen array in suitable conditions, it may be that the ordered set, or sequence, is repeatable, and unique to the specific component.

In embodiments, the response comprises the group. This may be particularly significant in embodiments in which the group does not correspond to the entirety, but only a sub-set, of the array, or embodiments in which either the group or the array does not form the entirety of the plurality of bipolar transistors in the device.

In embodiments the response comprises a sequence or a set of common or total main contact (either collector or emitter) currents at the respective onsets of thermal instability. The common collector current may be defined as the sum of collector currents of the individual transistors or devices, and thus corresponds to the total collector current. In such embodiments it may not be necessary to separately monitor or control the respective collector currents of individual transistors, since it may be possible to determine the set of the common collector currents—that is to say each of the values of the common collector current—at which thermal instability of one of the group of transistors occurs. The sequence of values of total collector current at which instabilities occur will generally correspond to a monotonically increasing sequence. Such an embodiment may require very precise measurement of the common collector current, but may require simpler circuitry than embodiments in which individual collector currents have to be detected.

According to a second aspect there is a provided physical unclonable function circuit comprising an array of bipolar transistors each having a base contact and main contacts being a collector contact and an emitter contact, and being either connectable in parallel or connected in parallel, so as to have a common collector contact, a common emitter contact and a common base contact, a stimulator for providing a stimulus to the array in dependence on a challenge, a detector for detecting an onset of instability in each of a group of the bipolar junction transistors in response to the challenge, and a response-generator for generating the response in dependence on the group, wherein the stimulus comprises a total main contact (either collector or emitter) current.

In embodiments, the bipolar transistors may be bipolar junction transistors. It is convenient to fabricate an array of such transistors. In other embodiments the bipolar transistors may be heterojunction bipolar transistors. In still other embodiments, the bipolar transistors may be parasitic transistors which are formed in association with MOS devices. The stimulator may be a current source.

In embodiments, the circuit comprises a plurality of bipolar transistors wherein the array is a sub-set of the plurality, and the challenge comprises information which enables selection of the array from the plurality of bipolar transistors. Selecting a subset of the plurality of transistors to comprise the array represents an additional degree of freedom, and thus when the PUF circuit is used for identification, may provide enhanced security. In the limit case the array may comprise a single transistor, although generally it will comprise more than one transistor.

In embodiments the stimulator comprises a current controller configured to supply the total main contact (either collector or emitter) current by increasing the supplied current from a first level to a second level at a controlled rate. The first level may typically be zero, or a relatively low quiescent level, and the second level may be a level by which instability may be expected to have occurred in a group of the transistors. Even if the total main contact current is not increased at a controlled rate, it will generally not change instantaneously from the first level to the second level, due to parasitics in the circuitry, and the rate of change resulting from such parasitics may typically provide sufficient time for the sequence in which the transistors undergo an onset of thermal electro-thermal instability to be detected by the detector; however, in order to more accurately or reliably detect the sequence, it may be preferable to control the rate at which the total collector current increases.

In embodiments the detector comprises at least one of an optical detector configured to detect optical emission from each of the group of transistors, and a current detector configured to detect, for each of the group of transistors, the respective main contact (either collector or emitter) current crossing a current threshold. Although generally electrical detection may be preferred, in specific embodiments it may be preferable to use optical detection, or a combination of both. Whereas electrical detection may provide for a generally simpler implementation, optical detection may result in fewer tell-tale signs (such as fields leaking outside of a chip package in which the device or component may be embedded), and thus be harder to decrypt, in circumstances where it is important not to be able to "hack" the device or component.

In embodiments the response comprises one of the group consisting of the sequence corresponding to the order in which the transistors in the group undergo an onset of electro-thermal instability, and the group. That is to say, in some embodiments the order in which the transistors in the group undergo instability may form the basis of the response; conversely, in other embodiments, in particular where the group is a subset of either the array of transistors or the entire plurality of transistors in the device, identification of the members of the group, that is to say the set which the group forms, may form the basis of the response without regard to the order in which the transistors individually undergo electro-thermal instability. In such cases, the response may not involve a sequence but an unordered set.

In embodiments the response comprises an ordered sequence of common collector currents at the respective onset of thermal instability.

The device or component may be comprised in wide variety of electronic components and systems in which it is desirable to be able to unique identify a chip, such as without limitation identification cards, e-passports and the like, electronic wallets or other electronic payment systems, RFID and near-field communication devices, secure access and remote access keys, inventory tracking tags and other anti-theft devices, and such like.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which FIG. 1 provides a schematic representation of the safe operating area of a typical bipolar transistor including a stability line.

It should be noted that the Figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

The present inventors have appreciated that an effect in bipolar transistor arrays may be exploited to form the basis of a PUF. The transistors may be junction transistors, and in particular maybe bipolar junction transistors (BJTs). However, the same effect has been observed in other bipolar transistors, in particular heterojunction bipolar transistors (HBTs), and may be expected to occur in parasitic bipolar devices, such as may occur in MOS devices. The effect is an instability effect, and may be considered to result from an interaction between thermal effects and electrical effects, and thus may be termed electro-thermal instability. The effect is referred to as electro-thermal instability, as will be discussed below. Whilst the invention should not be considered as being tied or constrained by any specific theory, which may be only partially or incompletely understood, in order to better understand embodiments, the concept of electro-thermal instability will now be described.

It is well-known that a bipolar junction transistor may be safely and reliably operated under a range of conditions known as the safe operating area (SOA). This is shown schematically in FIG. 1, in which a collector emitter voltage ($V_{CE}$) is plotted on the x-axis or abscissa against collector current ($I_C$) on the ordinate or y-axis. The safe operating area 110 is generally within a region bounded by a maximum voltage ($V_{MAX}$) 120, a maximum current ($I_{MAX}$) 130, and maximum junction temperature ($T_{MAX}$) 140. Outside of this region, the transistor may break down. Typically for bipolar transistors $V_{MAX}$ equals $VB_{CBO}$ while $I_{MAX}$ is determined by the electron migration limits, and other well-known process parameters. Depending on the technology, the "open emitter breakdown voltage" $VB_{CBO}$ can reach values between a few volts up to 20 V or more.

Figure 1:
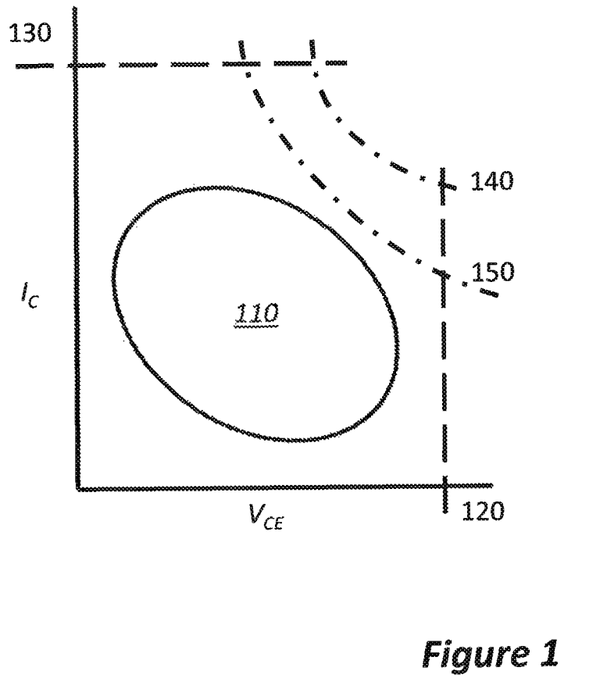

In addition to the maximum voltage, maximum current, and maximum temperature lines shown in FIG. 1, there is a so-called "stability" line 150 which has been recently discovered, and which may be different from the traditional $I_{MAX}$, $V_{MAX}$ and $T_{MAX}$ curves. The stability line 150 divides the IV curve into a stability region (that is to say below the stability line) and an instability region (that is above or to the right of the stability line). In short, the transistor stability line can be defined as the current-voltage combination at which the emitter current density is not equally divided any more across the, generally large, emitter area or areas. In other words, beyond (that is to say, to the right of or above) the stability line 150, the emitter current will be pinched towards the centre of the emitter area resulting in an extremely high local current density—that is to say a hotspot. In case of transistor arrays, one transistor may take over the entire current beyond the stability line. The present inventors have appreciated that the stability line may be utilised to provide a PUF concept—both device and method.

The stability line of a single transistor can be described by a simple equation:

$$I_C^{crit} = \frac{-M_n V_T}{M_n R_{eq} + R_{TH} V_{eq} \phi} \quad (1)$$

In which Mn is a multiplication factor (a process specific parameter), $V_T$ is the thermal voltage, $R_{TH}$ the thermal resistance, and $$\phi \equiv \frac{\partial V_{BE_i}}{\partial T_j}$$

at constant $I_C$ with $T_j$ the junction temperature and $V_{BEi}$ the internal base emitter voltage. The equivalent resistance $R_{eq}$ and voltage $V_{eq}$ are process and transistor specific parameters determined by the area, parasitic resistances and external voltages. A so-called critical collector current is a function of $V_{CE}$ and describes the maximum allowable current above which electro-thermal runaway occurs. It marks the transition from uniform to non-uniform current distribution.

Clearly, $I_C^{crit}$ also depends on temperature and transistor geometry, as is described by T. Vanhoucke and G. A. M. Hurkx, "Unified Electro-thermal Stability Criterion for Bipolar Transistors", BCTM 2005. It should be noted that for an array of N parallel devices, each transistor i (i=1 ... N) has its own critical collector current $I_{C_i}^{crit}$. Theoretically, identical transistors should have the same $I_{C_i}^{crit}$, given by Eq. (1); however, in every technology there are small process differences resulting in slightly different $I_{C_i}^{crit}$ values for different transistors. This may result in a unique current switching effect in parallel transistor arrays.

Furthermore, in a array of transistors, there will be some mutual interaction between the transistors, and in particular, there will be mutual heating. Even in an array of apparently identical transistors, there will be differences in the thermal paths between individual transistors. Some of these differences may by systematic, for instance, a gradual variation in metal track thickness from one side of a wafer to another, and the proximity of individual transistors to the edge of the array and/or to the environment, but some will be stochastic, for instance variation in metal track widths resulting from photolithography process variations. As a result, the mutual heating between transistors, will vary slightly from one array to another, apparently identical, array. Since the current switching effect which will be discussed in more detail below also depends on the transistor temperature, the mutual heating also has an influence on this effect.

This unique current switching effect (or bifurcation effect) in a transistor array of "apparently identical" transistors, will now be considered in more detail. Note that such current switching effects occur even in transistor arrays where all transistors are processed identically and are a result of differences in the critical collector currents, giving an unique pattern of the electrical and optical behaviour of the array. It may be possible to observe this effect by using an optical probing technique and studying the photo emission microscopy of the array. Moreover, it may be possible to provide a physical explanation of the effect.

Figure 2:
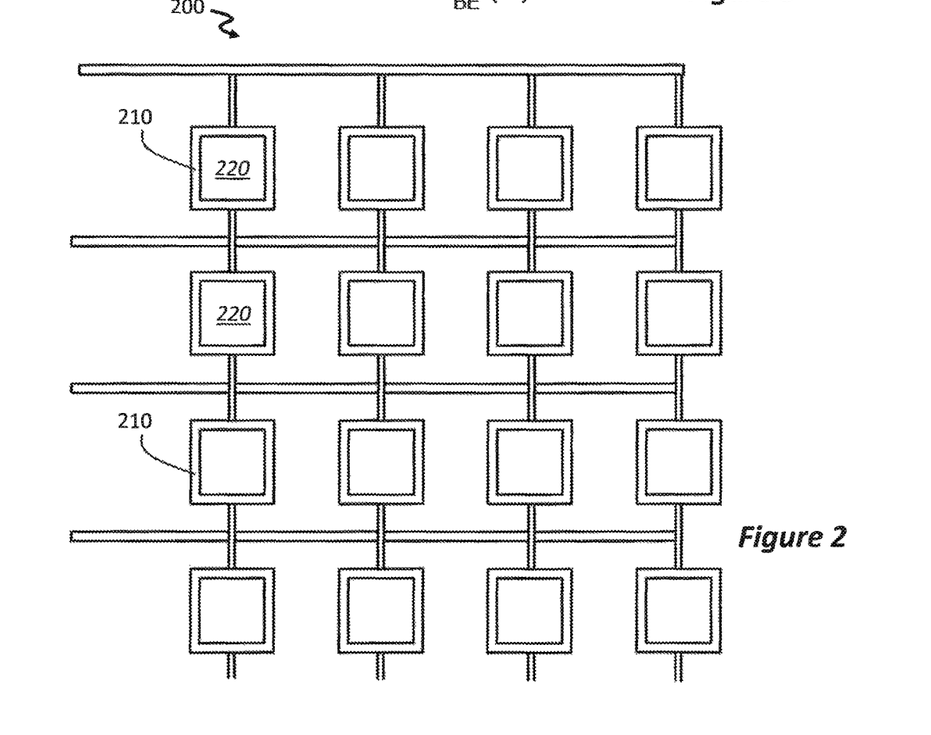
FIG. 2 shows a 4×4 bipolar transistor array with an optical window providing access for a photo emission microscopy study.
Figure 3:
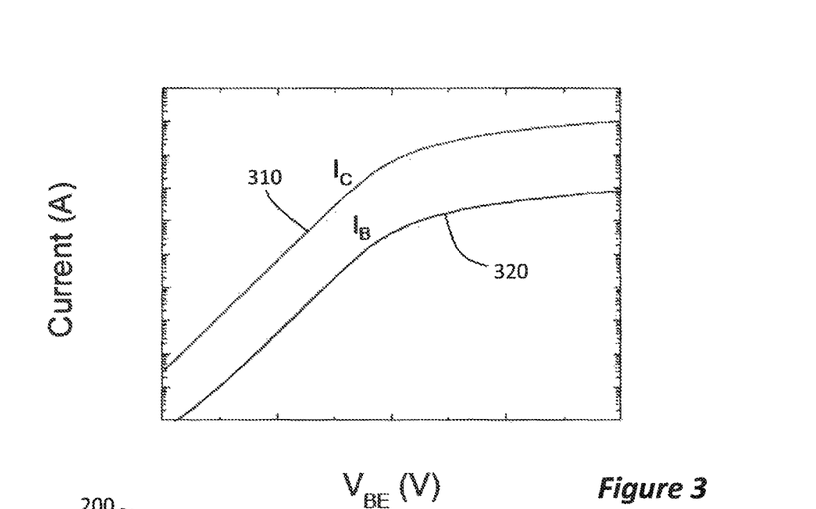
FIG. 3 illustrates a Gummel plot of a transistor array such as that shown in FIG. 2.

The current switching effect on a 4×4 transistor array, such as that is shown schematically at 200 in FIG. 2, will be considered. The figures shows, schematically, the emitters 210 of the array. In one experimental arrangement, each emitter 210 has lateral dimensions 7.0 micron×7.0 micron, and is manufactured with an open emitter breakdown voltage ($BV_{CEO}$) of 4.0 V and an open collector breakdown voltage ($BV_{CBO}$) greater than 16V. Such an array may be manufactured using for example standard or conventional BiMOS technology of NXP Semiconductors. Each of the devices is free from silicidation and metal at the centre of the emitters, which creates an optical window 220 for each transistor. This allows for the evaluation of the optical behaviour of each transistor individually using photo emission microscopy. For reference, the electrical characteristic of the total array is presented in FIG. 3, showing normal transistor behaviour. FIG. 3 shows a Gummel plot with currents on the ordinate or y-axis against base emitter voltage $V_{BE}$ on the abscissa or x-axis, for the collector current 310 ($I_C$) and the base current 320 ($I_B$).

Figure 4:
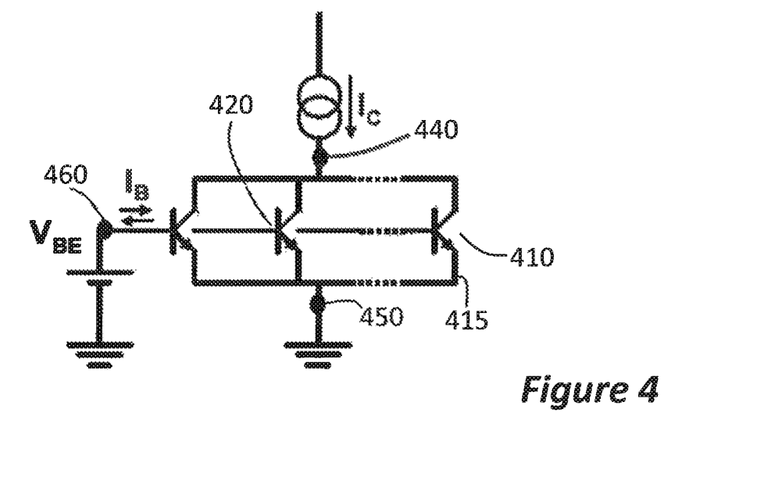
FIG. 4 shows the schematic configuration of electrical biasing of the transistor array arranged for photo mission microscopy study.

FIG. 4 shows the arrangement of the electrical biasing of the array, by means of a conventional biasing module which does not require special circuitry. The figure shows an array of transistors 410, having emitters 415 commonly connected at contact 450 and grounded. The transistor bases 420 are also commonly connected at contact 460, and offset from the emitter by a bias voltage $V_{BE}$. A total, or common, collector current $I_C$ is supplied to the arrangement through common collector contact 440. The skilled person will appreciate that, whereas FIG. 4 shows PNP transistors, a directly similar circuit is also possible for NPN transistors: embodiments are not generally restricted to just one type of transistor.

Figure 5:
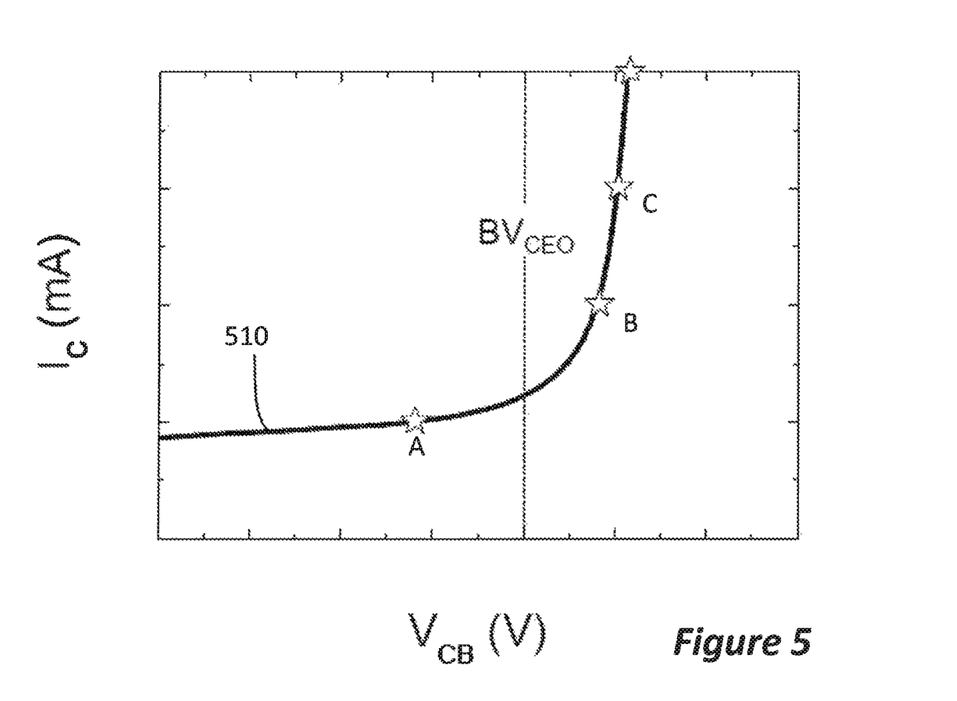
FIG. 5 shows the IV characteristic at constant bias voltage with increasing collector current.

At relatively high base biasing (which may be equal to $V_{BE}$=800 mV in the experimental example just mentioned), transistor photon emission can be observed at voltages above $BV_{CEO}$. This is in agreement with the well-known electron-hole avalanche process needed for photon generation. The electrical output characteristic 510 at such fixed $V_{BE}$ while changing the collector current $I_C$ and measuring the collector base voltage $V_{CB}$ is shown in FIG. 5, which plots collector current $I_C$ on the ordinate or y-axis against collector base voltage $V_{CB}$ on the abscissa or x-axis. In this example, the breakdown voltage $BV_{CEO}$ may be approximately 4 V.

Figure 6:
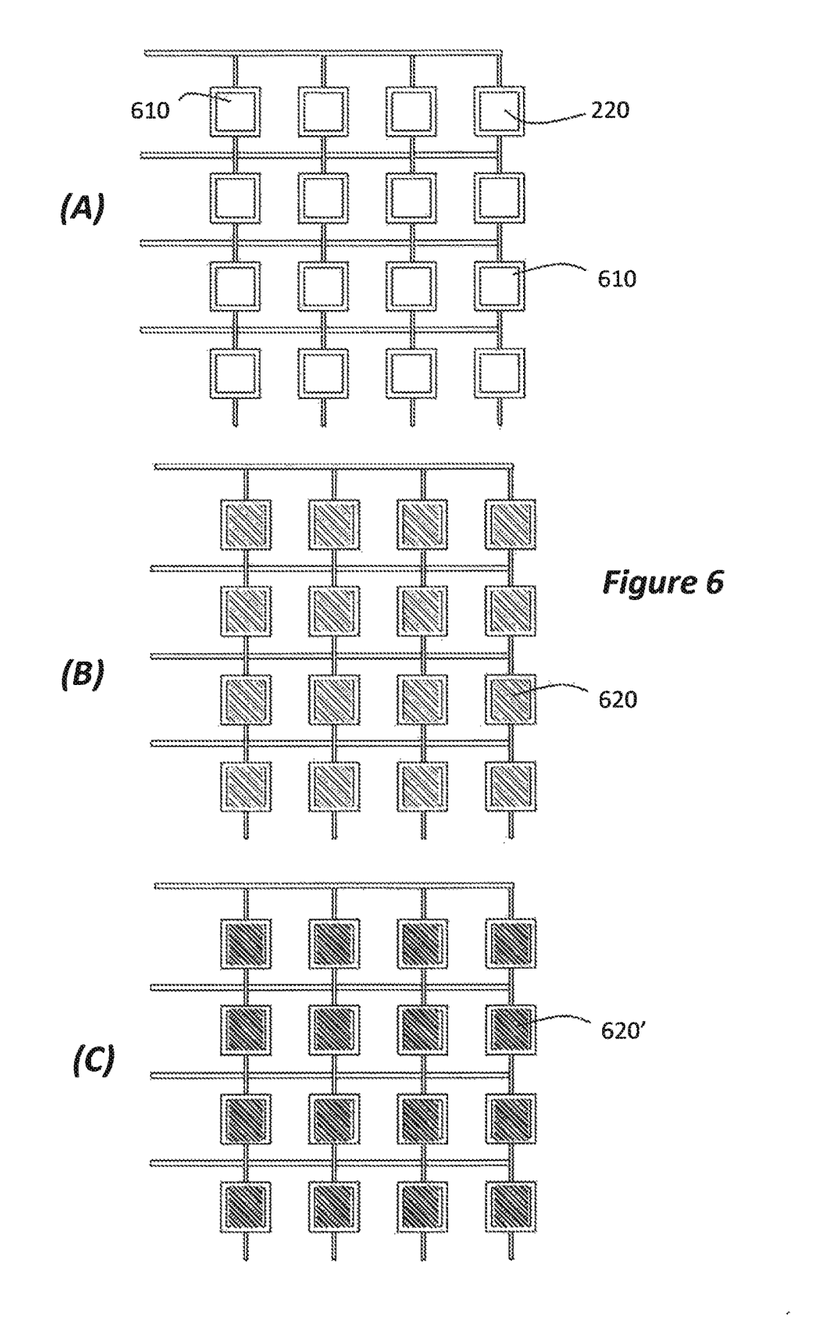
FIG. 6 shows, schematically, photo emission spectroscopy results of the array shown in FIG. 5.

The photo emission pattern corresponding to the electrical biasing in FIG. 5 is shown schematically in FIG. 6, at different collector base voltages: FIG. 6A shows the situation at a collector-base voltage which is less than the breakdown voltage, and marked as A on FIG. 5; FIG. 6B shows the situation at a collector-base voltage which is higher than the breakdown voltage, and marked as B on FIG. 5, and FIG. 6C shows the situation at a collector-base voltage which still higher, and marked as C on FIG. 5.

As may be expected, FIG. 5 shows the smooth behaviour of the IV curve, and photon emission with increasing currents occurs uniformly and intensifies smoothly, as illustrated in FIG. 6: below the breakdown voltage, there is no photo emission—this is depicted in the figure by the observation window 220 in each of the transistor 610 being a blank; above the breakdown voltage there is uniform photoemission, with each of the transistors emitting photons, as depicted by the light hash 620 of the observation windows 220 of each of the transistors 610. At still higher collector base voltage, the photo emission is stronger but still uniform with each transistor emitting photons, as depicted by the heavy hash 620' in each optical observation window 220. That is to say, for all collector currents, uniform photon emission is observed in the array with all transistors contributing equally to the photon generation. Increasing the current enhances the photon emission intensity as expected from the avalanche current mechanism.

Figure 7:
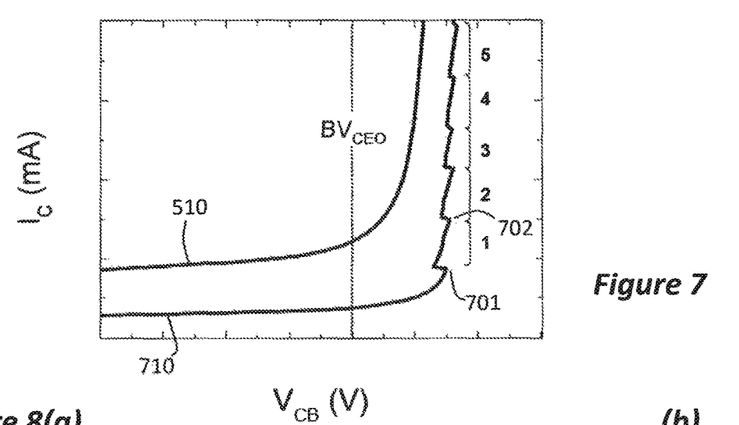
FIG. 7 shows the IV curve at constant bias voltage conditions, for two different bias voltages.

FIG. 7 shows the same IV electrical characteristic 510 as depicted in FIG. 5, along with an electrical IV characteristic 710, obtained at a lower base emitter bias $V_{BE}$. In the experimental setup mentioned above, such a base-emitter bias may correspond to approximately 740 mV. Keeping $V_{BE}$ constant, and increasing $I_C$ results in a sharp voltage snap-back at particular $I_C$-$V_{CB}$ combinations indicated by the intervals 1-5 in FIG. 7.

Figure 8A:
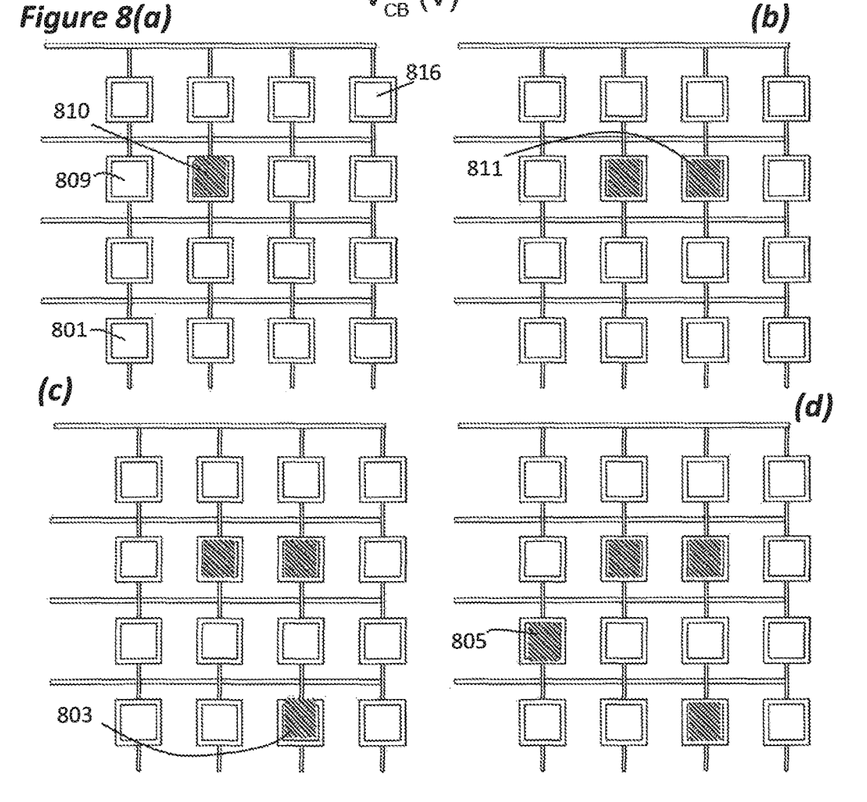
FIG. 8 shows, schematically, sequential photo emission microscopy results of the bipolar transistor array of FIG. 2.

Corresponding photo emission microscopy images are shown schematically in FIG. 8, at FIG. 8(a) for interval 1, FIG. 8b for interval 2, FIG. 8(c) for interval 3 and FIG. 8(d) for interval 4. As can be seen from FIG. 8, each snap-back corresponds to an additional transistor in the array contributing to the photon generation. In the illustrative example shown in FIG. 8, with a numbering system where the bottom left transistor is 801 and the top right is 816, the intervals 1-4 correspond to photo emission from transistors 810, 811, 803 and 805 respectively, it being understood that each transistor continues to emit, once emission starts. That is to say, for instance, at interval 3 each of transistors 810, 810 and 803 are emitting photons.

This optical switching at low $V_{BE}$ is a result of an instability, and in particular may be explained by electro-thermal instability when including thermal coupling between devices: every point at which a transistor starts to generate light is what may be termed a "bifurcation point". The first bifurcation point occurs when the current through a first transistor, 810 say, reaches its critical current $I_{C_{810}}{}^{crit}$, and corresponds to the onset of electro-thermal instability. Since the total current though the array is constant, at this point transistor 1 takes nearly all current and all other transistors decrease current (keeping the total collector current $I_C$ constant). This corresponds to bifurcation point 701 in FIG. 7 and to the observation in FIG. 8 at interval 1. Further increasing the total current $I_C$ results in current recovery in all other transistors, through the process of mutual heating. When one of the other transistors reaches its critical current, i.e. $I_{C2}=I_{C_{811}}{}^{crit}$, its current also sharply increases which is a second bifurcation point. At this stage two transistors carry the majority of the current of the array. This corresponds to bifurcation point 702 in FIG. 7 and to the observation in FIG. 8 at interval 2. This process repeats for all other transistors and results in a sequential switching of the transistors in the array.

The current switching effect is exactly what has been observed in the optical behaviour of the transistor array. Despite the fact that all transistors in the array are seemingly identical, very small differences in e.g. base resistances, fluctuations in (mutual) thermal resistances, small variations in the optical window (emitter resistance variation) result in slightly different critical collector currents for all devices according to equation (1), i.e.

$$I_{C_{810}}{}^{crit} \neq I_{C_{811}}{}^{crit} \neq I_{C_{803}}{}^{crit} \neq I_{C_{805}}{}^{crit} \neq \ldots$$

For example, the small difference in base resistance between 2 transistors in the array can be caused by small non-uniformities in the base epi-layer over the wafer which are always present in the process, or are introduced during the process.

The theory behind the bifurcation points may be generally explained as follows: since photon emission in each transistor can only take place at sufficiently high avalanche currents, each transistor can only emit photons when carrying sufficiently high currents. Therefore following FIG. 8 a sequential photo emission microscopy image of the array is observed as function of the total collector current. Note that despite the small difference in $I_{C_i}{}^{crit}$ between two transistors, the differences in total collector current between two adjacent bifurcation points can be large as observed in FIG. 7.

Figure 9:
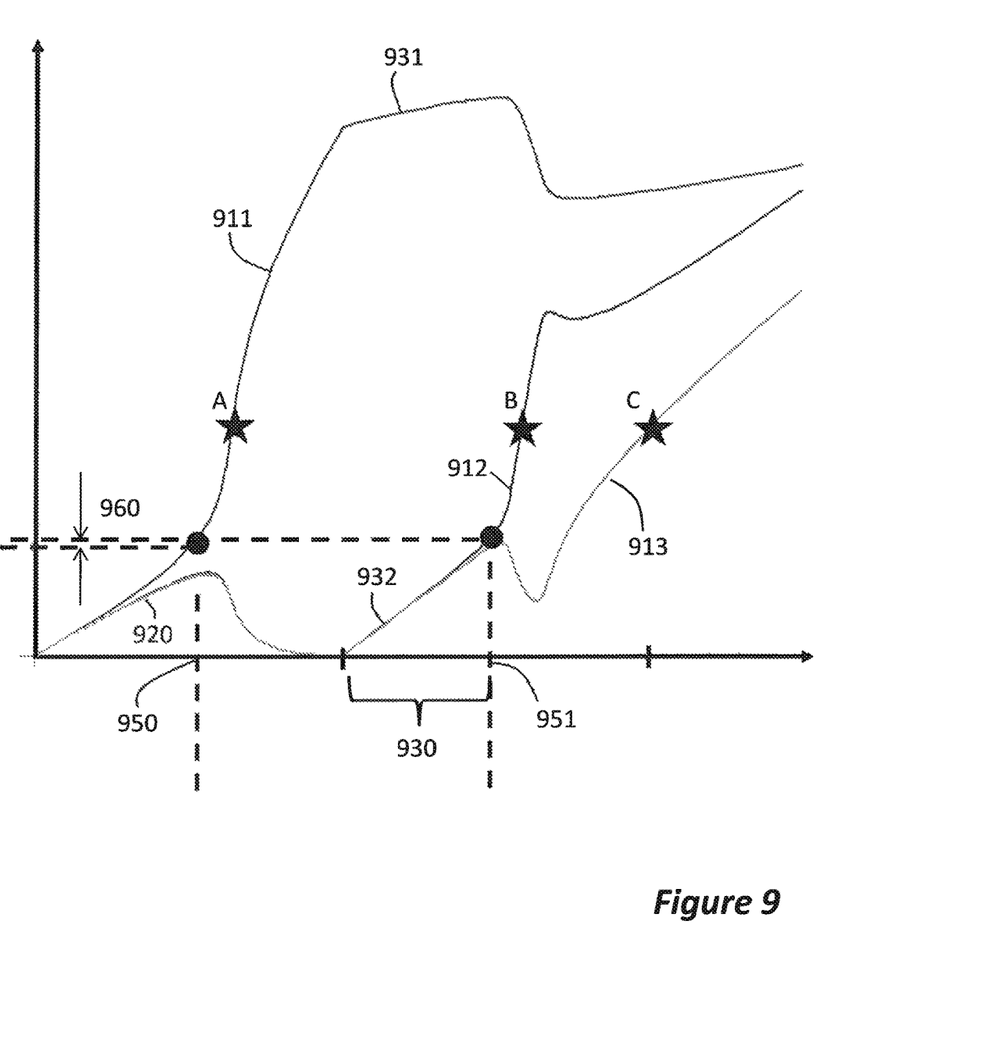
FIG. 9 shows the current switching effects of a transistor array of three devices and illustrating the effect of mutual self-heating.

The current switching effect can also be shown using equation (1). An example with just three transistors is illustrated in FIG. 9. FIG. 9 shows the individual transistor current for each of three transistors 901, 902 and 903 on the ordinate or y-axis, against the total current $I_C$ on the abscissa or x-axis, where $I_{C_{901}}{}^{crit} < I_{C_{902}}{}^{crit} < I_{C_{903}}{}^{crit}$. For the purposes of illustrations, assume that $I_{C_{901}}{}^{crit}=80.1$ mA, $I_{C_{902}}{}^{crit}=80.2$ mA and $I_{C_{902}}{}^{crit}=80.3$ mA. At low total collector current $I_C$, as shown for instance at 920, each of the transistors carries a similar amount of current. However, at 950 the transistor 901 reaches its critical current, $I_{C_{901}}{}^{crit}$ (80.1 mA in this example), and bifurcation occurs, with that transistor drawing an increasing part of the current, as shown at 911 whilst the respective current through each of the other two transistors falls back to nearly 0. As the current for transistor 901 increases, it starts to produce photo emission at A. However, since this transistor now carries significantly more current than the other transistors, heating starts to occur which reduces its conductivity, and as a result, with increasing total collector current, this transistor's current increases less quickly than that of the other transistors 902 and 903, as shown at 931 and 932 across total collector current region 930. As a result, at a higher total collector current 951, the second transistor 902 reaches its critical current $I_{C_{902}}{}^{crit}$ (80.2 mA in this example), and starts to draw an increasing share 912 of the current, until photo emission from that transistor 902 may be observed at B. Similarly, due to the heating effect of that transistor, self limitation occurs such that at a still higher total collector current, the current 913 through the third transistor 903 increases until that transistor reaches its critical current $I_{C_{903}}{}^{crit}$ (80.3 mA in this example), and starts to draw an increasing share of the current, until photo emission from that transistor 903 may be observed at C. Thus it will be appreciated that as result of a small difference 960 between the critical currents of individual transistors (0.1 mA in the example given), bifurcations can occur which results in the transistors during a significantly different fraction of the total collector current.

Thus far, the effect of temperature on the critical current has not been considered. As is clear from equation (1), the critical current of a transistor is affected by temperature through several of the parameters. As a result, in the above example the statement that for instance "$I_{C_{902}}{}^{crit}=80.2$ mA" may, in some circumstances, not always be correct. In particular, the device's critical current may change such, under some conditions (for instance when the temperature may vary between the transistors) it is no longer true that crit $I_{C_{901}}{}^{crit} < I_{C_{902}}{}^{crit} < I_{C_{903}}{}^{crit}$. Then, two scenarios need to be considered. In the case of slowly varying currents, it may be expected the device temperatures have time to stabilise so even though the above relative order may not hold, the order will be well-defined, and fixed. In that case, the effect of temperature may impact the sequence in which the transistors undergo an onset of instability, but the sequence may still be well-defined. The other instance is where the current is changed too fast for thermal stability to occur. In this non-equilibrium instance, it may still be expected that the sequence in which the transistors undergo an onset of instability will be well-defined, but it may be that the sequence is dependent on the speed at which the total current is varied (typically increased); in this case, it may be necessary or desirable to include the rate-of-change of total current information in the challenge, or pre-program it into the component, or otherwise ensure that it is well-defined and repeatable.

Of course, the skilled person will appreciate that temperature considerations are not limited to the above discussion of "dynamic" or changing temperatures, but it is also relevant to consider starting temperatures. (Since application of changing currents inevitably result in temperature changes due to changing ohmic losses, it is more appropriate to consider "starting" temperature rather than "static", temperature.) It may be appropriate to pre-set the starting temperature of the array, again either as part of a challenge, or by pre-programming it into the component.

Furthermore, in embodiments, the starting temperature of each transistor in the array need not be the same. For instance, it may be advantageous to modify the temperature of a sub-set of the array, for instance by locally heating selected transistors using one or more resistors positioned in the locale of one or more of those transistors of the array. Yet further, one or more of the transistors in the array may be used, themselves, as respective heat sources, by passing a current through it or them. The heating effect may then be accurately targeted to specific transistors. By selectively modifying the temperature of just a part of the array, the expected response to the challenge may be modified. The selection of which transistors to heat, and to what temperature to heat them to—or how much current to pass through them, may be pre-programmed into the array, or may form part of the challenge itself.

It has been shown experimentally, that the current switching effect just described may be reproducible; this means that for a given transistor array the current switching operation can be repeated in the same way. However, the switching effect is a unique pattern related to a specific transistor array which makes suitable for use as a PUF system. This is because the effect is related to a physical mechanism where only very small differences in, for example, the base resistance of <0.01% may reliably lead to an entirely different switching pattern due to the relation between resistance and critical current. Typically, the internal base resistance of a bipolar transistor is determined by the boron doped epi layer and variations of sheet resistance up to 10-20% are common practice. Moreover, the variations of epi thickness over the wafer (different between edge and centre of the wafer) also contribute to the pattern variation of different arrays. Therefore, it may be possible to use this switching effect as a fingerprint of a particular array in a repeatable and unique way.

The skilled person will readily appreciate that this principle may be used in a variety of implementations or embodiments in order to provide devices or methods relating to PUFs. Examples responses based on the bipolar-transistor-array PUF, will now be considered:

In embodiments, a fixed, predetermined total collector current is supplied to the transistors. The value of this total collector current may be supplied as a challenge to the PUF. Provided that the current is suitably selected, some but not all of the transistors may have undergone the onset of thermal instability in reaching this current. A "response" to the challenge may then be established, corresponding to the group of transistors which have reached their respective critical current and as a result undergone thermal instability. For example, in an array of 6 transistors $T_1, T_2, \ldots T_6$, it may be determined that the second, fourth and fifth transistors (i.e. $T_2$, $T_4$, and $T_5$) have exhibited thermal instability. A response may then be constructed, for example as a binary word, in which each of those transistors which have reached their respective critical current are represented by a "1" bit, and those which have not are represented by a "0" bit. In the above example, the binary word 010110 results (equivalent to a decimal "22").

Of course, the skilled person will appreciate that other encoding methods are also possible. For example and without limitation, rather than encoding the first transistor T1 as the most significant bit, it could encoded as the least significant bit (in which case the binary response in the above example would be 011010. Or those transistors which have not reached critical current could be encoded "1", and those which have, be encoded "0".

Determining whether a specific transistor has reached its respective critical current may be determined electrically. For instance, the collector current of that transistor may be compared with a threshold value using a comparator. Note that the threshold should be chosen so as to be above, or slightly above, the nominal critical current. Due to process variations, there will always be some tolerance on that value. However, since thermal instability results in a significant increase in current from a specific transistor as that transistor's current "runs away", the threshold may be chosen significantly above the nominal critical current. It should be mentioned that, since it might be possible that this specific transistor "robs" current from others which had already passed their critical current, it may be at least theoretically possible, in some circumstances, that those other transistors' collector current falls below the threshold, if it is selected to be significantly above nominal critical current. Such embodiments have the advantage of simplicity, and are capable of providing a response which depends on the challenge (that is to say the magnitude of the chosen total or common collector current). However, to encode a 128 bit response, such as is commonly used currently, requires an array of 128 transistors.

In other embodiments, fewer transistors may be required to provide a similar sized response:

It is possible to derive a PUF from the sequence in which the transistors exhibit the onset of thermal instability. Consider for example an array of N transistors, $T_1, T_2, \ldots T_i, \ldots T_N$. From the above analysis it may be seen that, for given conditions, as the total collector current is increased, the transistors reach critical current in a sequence, which is random, but repeatable (that is, stable). For example, for an array of 3 transistors, there are only 6 possibilities for the sequence:

(1) $(T_1, T_2, T_3)$
(2) $(T_1, T_3, T_2)$
(3) $(T_2, T_1, T_3)$
(4) $(T_2, T_3, T_1)$
(5) $(T_3, T_1, T_2)$
(6) $(T_3, T_2, T_1)$

In general, the skilled person will appreciate that for an array of N transistors, there are N! possible sequences. Thus, for an 8-bit "response" (i.e. one in which the sequence can take any one of 256 values), an array of 6 transistors is required (since 6!=720>256, whereas 5!=120<256). Similarly, for a 128 bit response (with $3.4 \times 10^{38}$ possible values), an array of size at least 35 transistors is required, since $35! = \sim 1.0 \times 10^{40}$.

In the case of a slowly changing total collector current, that is to say, the total collector current is changing on a timescale which is slow relative to the thermal and electrical time constants of the individual transistors, it may generally be considered that the resulting sequence is unique; however, if the total collector current changes very quickly, for instance, increases from 0 to a high level "instantaneously"

(to the extent that this is possible, the sequence may be affected by differences in electrical and thermal capacitances between the transistors in the array.

Another possible way of implementing the physical cloneable function from the array of bipolar transistors, relates to the total collector current and any one (or more) of the transistors. As already described, as the total array current is gradually increased, the transistors in the array reach their own critical current in a random, but repeatable, sequence. As a result (and as has been described in more detail hereinabove), although the differences between two critical currents, $I_{Ci}^{crit}$ and $I_{Cj}^{crit}$, may be small and thus difficult to measure, the difference between the two values of the total collector current, $I_{TC}$, at which these critical currents are reached, will in general be much larger. Detecting the values of total collector current at which the critical currents are reached, results in a series:

$\{I_{TC1}, I_{TC2}, I_{TC3}, I_{TC4} \ldots \}$.

The series may form the basis of a preferred identifier: a challenge may provided to the device, consisting of a particular sub-set of the transistors—either as an ordered sequence, such as for example $(T_5, T_1, T_2)$, or as an unordered set such as $\{T_1, T_2, T_5\}$. Then, the response to the challenge may be determined to be the total collector currents corresponding to the onset of instability of each of $T_5, T_1$ and $T_2$—in the first case, as an ordered sequence, and in the second case, as an unordered set. So, in the example above, if the onset of instability for $T_1, T_2, T_5$ occurs at 25 mA, 5 mA and 15 mA respectively, the response to the first type of challenge (ordered sequence) would be (15 mA, 25 mA, 5 mA), whereas the response to the second type of challenge (unordered set) would be $\{5$ mA, 15 mA, 25 mA$\}$.

Figure 10:
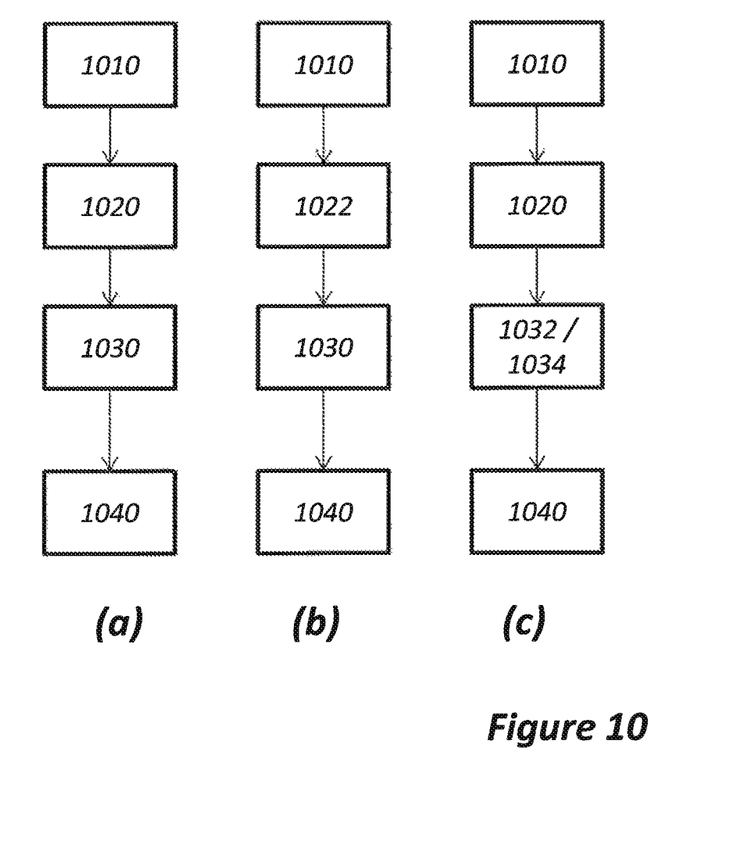
FIG. 10 shows at (a), (b) and (c) flowcharts of methods of identifying a component by a response to a challenge, the component comprising an array of bipolar junction transistors.

FIG. 10(a) shows a flowchart of a method of identifying a component by a response to a challenge the component comprising an array of bipolar junction transistors connectable in parallel so as to have a common collector contact, a common emitter contact and a common base contact, the challenge comprising a value representative of a total collector current value. The method comprises, at 1010, receiving the challenge; at 1020 supplying the total collector current to the common collector contact; at 1030 detecting instability in each of a group of the transistors; and at 1040 determining the response in dependence on the group. Supplying a total collector current may comprise increasing the supplied current from a first level to a second level at a controlled rate, as shown at 1022 in FIG. 10(b); detecting the onset of electrothermal instability may comprise detecting optical emission from the respective transistor, as shown at 1032 in FIG. 10(c); alternatively it may comprise detecting the collector currents of the respective transistor crossing a current threshold, shown at 1034. In embodiments in which individual transistors, or groups of transistors, are connectable or disconnectable, connection (or disconnection) may be achieved by selecting (or deselecting) column address lines, or row address lines, for xy addressable arrays, or through individual switches, all as will be familiar to the skilled person.

Figure 11:
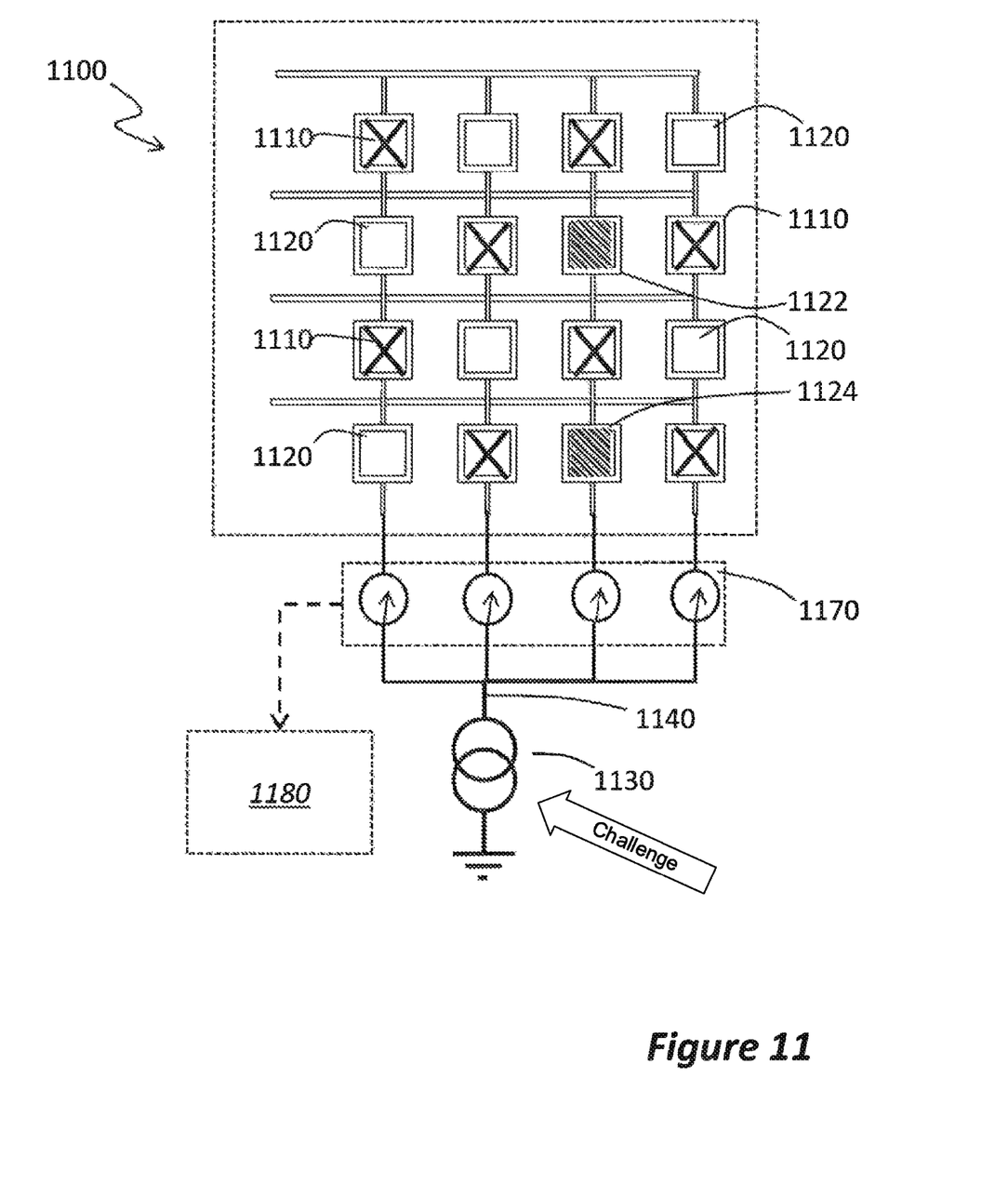
FIG. 11 shows a conceptual schematic of embodiments.

FIG. 11 shows a conceptual schematic of embodiments. The figure shows a physical unclonable function circuit 1100 comprising an array of bipolar transistors 1120. As shown in the figure, the transistors 1120 comprise part of a plurality of bipolar transistors 1120, 1110, 1122, 1124. The transistors are connected such that the transistors 1110 shown marked with a "X" are not connected to the common collector contact, whereas the transistors 1120 shown without a "X" are connected to the common collector contact. Thus all of the transistors 1120, which are not marked with a "X", form part of the array. In this figure, the array of transistors 1120 thus corresponds to alternate transistors of the plurality. In other words, in this figure, the array of transistors is each of the odd-numbered transistors of the plurality. The bipolar transistors are connectable in parallel so as to have a common collector contact 1140 (c.f. 440 in FIG. 4), a common emitter contact below the plane of the figure, and not shown, but c.f. 450 in FIG. 4) and a common base contact (again not shown, but c.f. 460 in FIG. 4). The circuit includes a stimulator 1130 for providing a stimulus to the array in dependence on a challenge; in the embodiment shown, the stimulator 1130 is a current generator, but in other embodiments it may be more complex—for instance it may comprise a switching mechanism to determine which of the plurality of transistors form the array. The circuit further comprises a detector 1170 for detecting an onset of instability in each of a group of the bipolar junction transistors in response to the challenge; as shown the detector may comprise a set of current monitors, or, for instance, a set of comparators to compare the current through individual transistors or groups of transistors with a threshold, or a total current monitor to monitor the total or combined collector current. The circuit further comprises a response-generator 1180 for generating the response in dependence on the group, wherein the stimulus comprises a total collector current.

From reading the present disclosure, other variations and modifications will be apparent to the skilled person. Such variations and modifications may involve equivalent and other features which are already known in the art of physical unclonable functions, and which may be used instead of, or in addition to, features already described herein.

Embodiments have been described above with reference to collector currents. The skilled person will appreciate that, in other embodiments, it may be more appropriate or convenient to supply to or measure currents through the emitter contact rather than through the collector. In other words, transistors may be "inverted" with respect to, for instance, the configuration shown in FIG. 4. Although the performance of such transistors may be expected to be significantly worse than transistors conventionally connected, for the purposes of the present disclosure, the transistor performance, per se, is not critical, and thermal instability may still be anticipated to result.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method of identifying a component by an electrical circuit response of the component to an electrical challenge input, the component comprising an array of bipolar transistors each having a base contact, and each having main contacts being a collector contact and an emitter contact, and being configured and arranged to be connected in parallel so as to have a common collector contact, a common emitter contact and a common base contact, the method comprising:
  receiving the electrical challenge input;
  in response to the electrical challenge input and with the array of bipolar transistors being connected in parallel, supplying a total main contact current to one of the common main contacts by increasing a current supplied to the respective common main contact from a first level to a second level;
  detecting instability in at least one transistor in a group of the array of bipolar transistors;
  determining the electrical circuit response in dependence on the group and the detected instability; and
  authenticating the component based on the electrical circuit response,
  wherein the instability is an onset of electro-thermal instability, and authenticating the component by:
  identifying bipolar transistors in the array among a plurality of transistors of the component responsive to the electrical challenge input;
  determining a pattern of an onset of instability of the identified bipolar transistors in the array using the determined electrical response; and
  authenticating the component responsive to the pattern for the electrical challenge input using the determined pattern.

2. The method of claim 1, wherein the electrical challenge input comprises a value representative of the total collector current.

3. The method of claim 1, wherein the component comprises the plurality of bipolar transistors wherein the array of bipolar transistors is a sub-set of the plurality, the electrical challenge input further comprises information which enables the identification and selection of the array, and the method further comprises selecting the identified array from the plurality of bipolar transistors, wherein authenticating the component responsive to the pattern for the electrical challenge input includes using the determined pattern and a stored pattern for the electrical challenge input,
  the method further including pre-programming patterns, by the electrical circuit, for a plurality of electrical challenge inputs, including the electrical challenge input, or identifying and storing the pattern using information in the electrical challenge input.

4. The method of claim 1, wherein supplying the total main contact current comprises increasing the supplied current from a first level to a second level at a controlled rate, wherein the determined pattern includes a rate-of-change of total current information in the electrical challenge input.

5. The method of claim 1, wherein detecting the onset of electro-thermal instability comprises detecting optical emission from the respective transistor responsive to the electrical challenge input.

6. The method of claim 1, wherein detecting the onset of electro-thermal instability comprises detecting the main contact current of the respective transistor crossing a current threshold responsive to the electrical challenge input.

7. The method of claim 1, wherein the response is determined from all transistors in the group.

8. The method of claim 1, wherein the response comprises a sequence of or a set of common main contact currents at the respective onsets of electro-thermal instability, further including forming the array of bipolar transistors by identically processing each of the bipolar transistors of the array.

9. The method of claim 1, wherein detecting the instability includes detecting breakdown of at least one of the bipolar transistors.

10. The method of claim 1, wherein determining the circuit response includes identifying the component using the detected instability of a one or more of the bipolar transistors.

11. A method of identifying a component by an electrical circuit response of the component to an electrical challenge input, the component comprising an array of bipolar transistors each having a base contact, and each having main contacts being a collector contact and an emitter contact, and being configured and arranged to be connected in parallel so as to have a common collector contact, a common emitter contact and a common base contact, the method comprising:
  receiving the electrical challenge input;
  in response to the electrical challenge input and with the array of bipolar transistors being connected in parallel, supplying a total main contact current to one of the common main contacts by increasing a current supplied to the respective common main contact from a first level to a second level;
  detecting instability in at least one transistor in a group of the array of bipolar transistors;
  determining the electrical circuit response in dependence on the group and the detected instability; and
  authenticating the component based on the electrical circuit response,
  wherein the response comprises a sequence corresponding to a sequence order in which each of the transistors in the group undergo an onset of electro-thermal instability responsive to the electrical challenge input; and
  authenticating the component responsive to identifying the sequence order in which each of the transistors in the group undergoes an onset of electro-thermal instability matches a defined pattern for the electrical challenge input.

12. A physical unclonable function circuit comprising
  an array of bipolar junction transistors each having a base contact and main contacts being a collector contact and an emitter contact, and being configured and arranged to be connected in parallel so as to have a common collector contact, a common emitter contact and a common base contact,
  a stimulator circuit for providing an electrical stimulus to the array in dependence on an electrical challenge input,
  a detector for detecting an onset of instability in each of a group of the array of bipolar junction transistors in response to the electrical challenge input,
  a response-generator circuit configured and arranged with the detector for generating an electrical circuit response output in dependence on the group and the detected instability, the response being indicative of an authentication of the physical unclonable function circuit,
  wherein the stimulus comprises a total main contact current,
  a heating circuit configured and arranged to locally heat at least one of the bipolar junction transistors, wherein the detector is configured and arranged to detect instability caused by both the local heat and the current supplied to the bipolar transistors, and the response-generator circuit is configured and arranged to provide the circuit response output based on the detected instability, with the circuit response output being indicative of a known characteristic of the circuit including the array of bipolar transistors that distinguishes the array of bipolar junction transistors from a clone thereof.

13. The circuit of claim 12 comprising a plurality of bipolar transistors wherein the array is a sub-set of the plurality, and the electrical challenge input comprises information which enables selection of the array from the plurality of bipolar transistors.

14. The circuit of claim 12, wherein the stimulator circuit comprises a current controller configured to supply the total main contact current by increasing the supplied current from a first level to a second level at a controlled rate.

15. The circuit of claim 12, wherein the detector comprises at least one of an optical detector configured to detect optical emission from each of the group of bipolar junction transistors, and a current detector configured to detect, for each of the group of bipolar junction transistors, the respective main contact current crossing a current threshold.

16. The circuit of claim 12, wherein the response comprises one of the responses in the group consisting of: (a) a sequence corresponding to an order in which the bipolar junction transistors in the group undergo an onset of electrothermal instability; (b) a response of all of the bipolar junction transistors in the group; and (c) an ordered sequence of common main contact currents at the respective onset of thermal instability.

17. The physical unclonable function circuit of claim 12, wherein the heating circuit is configured and arranged to locally heat at least two of the bipolar junction transistors to different starting temperatures.

18. A method of identifying a component by an electrical circuit response of the component to an electrical challenge input, the component comprising an array of bipolar transistors each having a base contact, and each having main contacts being a collector contact and an emitter contact, and being configured and arranged to be connected in parallel so as to have a common collector contact, a common emitter contact and a common base contact, the method comprising:
receiving the electrical challenge input;
in response to the electrical challenge input and with the array of bipolar transistors being connected in parallel, supplying a total main contact current to one of the common main contacts by increasing a current supplied to the respective common main contact from a first level to a second level;
detecting instability in at least one transistor in a group of the array of bipolar transistors;
determining the electrical circuit response in dependence on the group and the detected instability; and
authenticating the component based on the electrical circuit response;
the method further including locally heating at least one of the bipolar transistors, wherein detecting the instability includes detecting instability caused by both the local heat and the current supplied to the bipolar transistors, and wherein determining the circuit response includes identifying the component based on the detected instability.

* * * * *